(12) United States Patent
Ohnishi

(10) Patent No.: US 9,896,588 B2
(45) Date of Patent: Feb. 20, 2018

(54) INK AND INKJET RECORDING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/655,055

(22) PCT Filed: Dec. 20, 2013

(86) PCT No.: PCT/JP2013/084283
§ 371 (c)(1),
(2) Date: Jun. 24, 2015

(87) PCT Pub. No.: WO2014/103942
PCT Pub. Date: Jul. 3, 2014

(65) Prior Publication Data
US 2015/0344710 A1    Dec. 3, 2015

(30) Foreign Application Priority Data

Dec. 28, 2012  (JP) .................................. 2012-289014

(51) Int. Cl.
*C09D 11/30* (2014.01)
*C09D 11/102* (2014.01)
*C09D 11/322* (2014.01)

(52) U.S. Cl.
CPC ............ *C09D 11/30* (2013.01); *C09D 11/102* (2013.01); *C09D 11/322* (2013.01)

(58) Field of Classification Search
None
See application file for complete search history.

(56) References Cited

U.S. PATENT DOCUMENTS

| | | | | |
|---|---|---|---|---|
| 2005/0007432 A1* | 1/2005 | Kanaya | ................ | C09D 11/322 347/100 |
| 2007/0129463 A1* | 6/2007 | Ma | ....................... | C09D 11/322 523/160 |

FOREIGN PATENT DOCUMENTS

| | | |
|---|---|---|
| JP | 2001-152063 | 6/2001 |
| JP | 2007-231214 | 9/2007 |
| JP | 2008-013605 | 1/2008 |
| JP | 2009-298953 | 12/2009 |
| JP | 2010-084066 | 4/2010 |

(Continued)

OTHER PUBLICATIONS

Masako, JP 2008-013605, english translation.*

(Continued)

*Primary Examiner* — An Do
*Assistant Examiner* — Renee I Wilson
(74) *Attorney, Agent, or Firm* — JCIPRNET

(57) ABSTRACT

The object is to provide an ink advantageous in that an ink film thereby formed excels in strength and adhesiveness to print media. To achieve the object, an ink according to the present invention includes: a disperse solvent; first binder resin particles (1) containing a coloring agent (3) and emulsified or suspended in the disperse solvent; and second binder resin particles (2) emulsified or suspended in the disperse solvent, wherein the second binder resin particles (2) have an average particle size smaller than an average particle size of the first binder resin particles (1).

9 Claims, 1 Drawing Sheet

(56) References Cited

FOREIGN PATENT DOCUMENTS

JP          2010-180419        8/2010
WO          2004/029164        4/2004

OTHER PUBLICATIONS

"International Search Report (Form PCT/ISA/210)", dated Apr. 1, 2014, with English translation thereof, pp. 1-4.
"Search Report of European Counterpart Application", dated Jan. 18, 2016, pp. 1-4.
"Office Action of Japan Counterpart Application" with English translation thereof, dated Dec. 20, 2016, pp. 1-10.
"Final Office Action of Japan Counterpart Application" with English translation thereof, dated Mar. 14, 2017, pp. 1-8.

* cited by examiner

INK AND INKJET RECORDING METHOD

CROSS-REFERENCE TO RELATED APPLICATION

This application is a 371 application of international PCT application serial no. PCT/JP2013/084283, filed on Dec. 20, 2013, which claims the priority benefit of Japan application no. JP 2012-289014, filed on Dec. 28, 2012. The entirety of each of the above-mentioned patent applications is hereby incorporated by reference herein and made a part of this specification.

TECHNICAL FIELD

The present invention relates to an ink and an inkjet recording method.

BACKGROUND ART

The patent documents 1 and 2 describe inks for use in the inkjet recording devices. These inks respectively contain resin-coated and microcapsulated coloring agents.

PRIOR ART DOCUMENTS

Patent Documents

Patent Document 1: JP 2010-180419 A (disclosed on Aug. 19, 2010).
Patent Document 2: JP 2010-84066 A (disclosed on Apr. 15, 2010).

SUMMARY OF THE INVENTION

Problems to be Solved by the Invention

In such inks respectively containing the microcapsulated pigments as described in the patent documents 1 and 2, there may be voids among the adjacent microcapsules, in which case an ink layer formed by using such inks unavoidably contains a high proportion of air. This disadvantageously lowers the ink film in density, degrading its strength and adhesiveness to a print medium.

The present invention was accomplished to solve this problem, and has an object to provide an ink that fulfills a required strength of an ink film and a high adhesiveness of the ink film to print media.

Solutions to the Problems

To achieve the object, an ink according to the present invention includes: a disperse solvent; particles of a first binder resin containing a coloring agent and emulsified or suspended in the disperse solvent; and particles of a second binder resin emulsified or suspended in the disperse solvent, wherein the particles of the second binder resin have an average particle size smaller than an average particle size of the particles of the first binder resin.

In an ink film formed on a print medium by the ink thus characterized, the particles of the second binder resin smaller in average particle size can adequately fill up the voids among the particles of the first binder resin larger in average particle size. By having the second binder resin particles smaller in average particle size fill up the voids among the first binder resin particles larger in average particle size, the ink film formed on the print medium increases in density. This improves the ink film in strength and adhesiveness to the print medium.

In the ink according to the present invention, the average particle size of the particles of the first binder resin is preferably equal to or greater than 100 nm and equal to or less than 2000 nm.

This makes it least likely that the first binder resin particles are aggregated or precipitated in the ink.

In the ink according to the present invention, the average particle size of the particles of the second binder resin is preferably equal to or smaller than ⅓ of the average particle size of the particles of the first binder resin.

The particles of the second binder resin thus smaller in average particle size can adequately fill up the voids among the particles of the first binder resin. This improves the ink layer formed on the print medium in strength and adhesiveness.

In the ink according to the present invention, the first binder resin preferably has a glass transition temperature higher than a glass transition temperature of the second binder resin.

In the ink thus characterized, the second binder resin can be rapidly liquefied by heating the print medium after the ink is discharged thereon. It is accordingly facilitated by the liquefied second binder resin to quickly anchor the particles of the first binder resin to the print medium.

In the ink according to the present invention, at least one of the particles of the first binder resin and the particles of the second binder resin are preferably particles coated with a binder resin having a higher glass transition temperature than the glass transition temperature of the particles.

In the ink thus characterized, at least one of the particles of the first binder resin and the particles of the second binder resin are core-shell structured particles coated with a binder resin having a higher glass transition temperature than the glass transition temperature of the particles. Then, the particles are very unlikely to stick to or aggregate with one another because their surfaces are coated with a binder resin having a high glass transition temperature. The particles of the first and second binder resins may be both coated with the same binder resin, in which case dispersion of the particles in the disperse solvent is favorably stabilized.

An inkjet recording method according to the present invention includes: a discharging step of discharging the ink on a print medium; and a heating step of heating the ink landed on the print medium.

According to the configuration, the ink can be suitably used for printing of various kinds of print media.

Effect of the Invention

The ink according to the present invention contains the particles of the colorant-containing first binder resin, and the particles of the second binder resin smaller in average particle size than the particles of the first binder resin. The ink thus can form an ink film that excels in strength and adhesiveness to the print medium, thereby providing a high-quality print.

EMBODIMENT OF THE INVENTION

[Ink]

An ink according to the present invention includes: a disperse solvent; particles of a first binder resin containing a coloring agent and emulsified or suspended in the disperse solvent; and particles of a second binder resin emulsified or suspended in the disperse solvent, wherein the particles of the second binder resin have an average particle size smaller than an average particle size of the particles of the first binder resin.

For the sake of convenience in describing the present invention, particles of the respective binder resins are herein referred to as "binder resin particles". The "ink" described herein includes, as well as colored liquids for coloring print media, coating agents for coating print media, and clear liquids.

Figure 1:
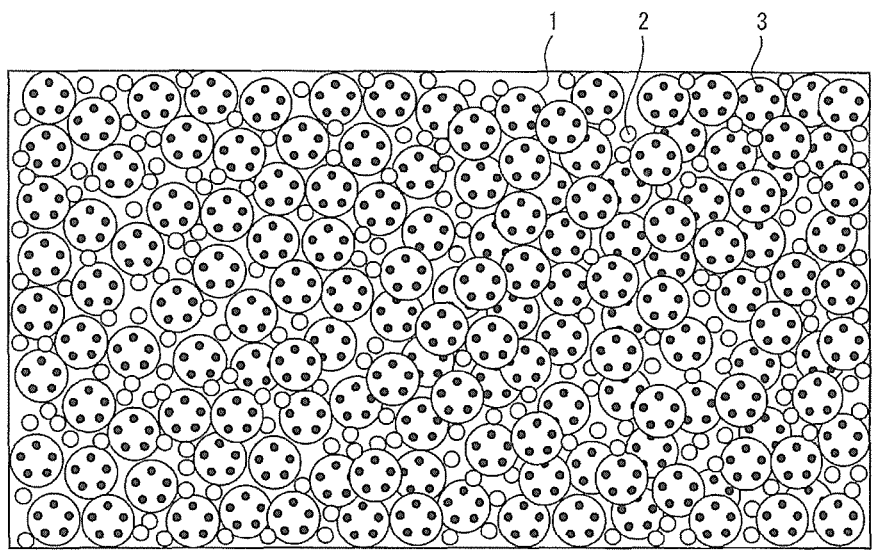
FIG. 1 is a schematic drawing of an ink according to an embodiment of the present invention.

An ink according to an embodiment of the present invention is hereinafter described with reference to FIG. 1. FIG. 1 is a schematic drawing of first binder resin particles 1 and second binder resin particles 2 in the ink according to the embodiment of the present invention. As illustrated in FIG. 1, the second binder resin particles 2 have an average particle size smaller than an average particle size of the first binder resin particles. The first binder resin particles 1 contain a coloring agent 3, wherein the coloring agent 3 is dispersed or dissolved in the first binder resin particles 1. The first binder resin particles 1 and the second binder resin particles 2 are emulsified or suspended in a disperse solvent.

[Binder Resin Particles]

The first binder resin particles 1 and the second binder resin particles 2 may be obtained from a binder resin or different binder resins. However, the first binder resin particles 1 and the second binder resin particles 2 obtained from the same binder resin can be more suitably fusion-bonded to a print medium.

The binder resins, which are the base materials of the first binder resin particles 1 and the second binder resin particles 2, may be selected from hydrophilic binder resins and hydrophilized binder resins. Any materials which are insoluble in vehicles may be used to obtain the binder resins. A preferable example is at least a resin selected from high molecular compounds to be cured and high molecular compounds cured by photopolymerization or thermal polymerization. Other examples are monomers, oligomers, and low molecular resins that are polymerized to be cured thermally or by energy beam irradiation such as ultraviolet, electron beam, or radiation. The "vehicles" in this description refer to components of the ink, other than the binder resins, in which fine particles are dispersed or dissolved, indicating a disperse solvent, an additive, and a cosolvent described later.

Examples of the binder resin are vinyl-based resins, acrylic resins, alkyd-based resins, polyester-based resins, polyurethane-based resins, styrene-based copolymers, hybrid resins of combinations of styrene-based copolymers and polyester-based resins, crystalline polyester-based resins, silicon-based resins, fluororesins, epoxy-based resins, phenoxy-based resins, polyolefin-based resins, and modified resins obtained from these resins. Of these examples, polyester-based resins, acrylic resins, polyurethane-based resins, crystalline polyester-based resins are preferably used, and polyester-based resins are particularly preferable.

Other examples of the binder resin are natural rubber latex, styrene-butadiene latex, styrene-acrylic latex, and polyurethane latex. It is particularly preferable to prepare the binder resin from, for example, an undiluted solution of one selected from these resins or an emulsion-polymerized result of the undiluted solution. This increases the likelihood of obtaining spherical particles when a low-viscosity liquid resin yet to be polymerized is dispersed in water, which is preferable. When one of these resins is selected and used as the binder resin, the selected resin may be a polymer-dispersion resin requiring a dispersant or a self-dispersion resin (literature cited: JP 2001-152063 A).

Any one of these resins may be singly used, or some of them may be combined and used as the binder resin. For improvements in low-temperature anchoring and adhesion to print media, a resin with a low glass transition point (TG) and a high-TG resin excellent in fastness are preferably combined and used as the binder resin.

Table 1 shows exemplified cured high molecular compounds. Any one selected from these examples may be singly used, or some of them may be combined and used. For improvements in low-temperature anchoring and adhesion to recording media, a resin with a low glass transition temperature (TG) and a high-TG resin excellent in fastness are preferably combined and used.

TABLE 1

Types of Synthetic Latex and Abbreviations

| Polymers | Abbreviation | Commonly known in Japan by |
|---|---|---|
| natural rubber | NR | natural rubber latex |
| polybutadiene | EBR, PBR | EBR latex |
| styrene-butadiene copolymer | SBR | SBR latex |
| acrylonitrile-butadiene copolymer | NBR | NBR latex |
| methyl methacrylate-butadiene copolymer | MBR | MBR latex |
| 2-vinylpyridine-styrene-butadiene copolymer | VP | VP latex vinylpyridine latex |
| polychloroprene | CR | chloroprene latex |
| polyisoprene | IR | IP latex |
| polystyrene | PS | polystyrene latex |
| polyurethane | U | polyurethane latex polyurethane emulsion |
| acrylate-based copolymer | AR, ACL | acrylic latex acrylate emulsion |
| polyvinyl acetate vinyl acetate copolymer | PVAC | vinyl acetate emulsion vinyl acetate emulsion or the like |
| vinyl acetate-ethylene copolymer acrylate-styrene copolymer | BVA | BVA emulsion acrylic-styrene emulsion |
| polyethylene | PB | polyethylene emulsion |
| vinyl chloride-based copolymer | PVC | vinyl chloride latex |
| vinylidene chloride-based copolymer | PVdC | vinylidene (chloride) latex |
| epoxy | | epoxy emulsion |

In the ink, the coloring agent 3 is contained in the first binder resin particles 1. FIG. 1 illustrates an example in which the coloring agent 3 is contained in the first binder resin particles 1. Instead, the first binder resin particles 1 may be dyed with the coloring agent 3 by dispersing or dissolving the coloring agent in the first binder resin particles 1. Optionally, the second binder resin particles 2 may be dyed with the coloring agent, or the coloring agent 3 is contained in the second binder resin particles 2.

Fine particles of the coloring agent 3 thus contained in the first binder resin particles 1 are not directly present in the ink, preventing possible aggregation of the fine particles. Therefore, a dispersant is unnecessary to disperse the coloring agent 3 in the disperse solvent. The coloring agent 3 contained in the first binder resin particles 1 can be thereby protected. Then, the coloring agent 3 is substantially unaffected by ultraviolet, and the ink is improved in light fastness. Also, the coloring agent 3 is substantially unaffected by oxygen. With these advantages combined, any change of properties of the coloring agent 3 resulting from exposure to ultraviolet and/or oxygen can be greatly suppressed.

Each of the first binder resin particles 1 may contain a plurality of coloring agents 3. The coloring agent 3 contained in the first binder resin particles 1 may be one type of coloring agent 3 or a mixture of different coloring agents.

To prepare the first binder resin particles 1 and the second binder resin particles 2 both containing the coloring agent 3, for example, the binder resins are mixed with the coloring agent and then polymerized by emulsion polymerization, suspension polymerization, dissolution suspension, or ester elongation polymerization. The second binder resin particles 2, if containing no coloring agent, can be obtained by directly polymerizing the binder resin by emulsion polymerization, suspension polymerization, dissolution suspension, or ester elongation polymerization.

The binder resin may be a disperse dye-containing polyester resin dyed with the disperse dye heated and dissolved therein, or an oxidation dye-containing or reactive dye-containing nylon resin dyed with the oxidation dye or reactive dye heated and dissolved therein. These exemplified binder resins can provide a very clear, smear-free, and vividly-colored ink advantageously used for inkjet printing.

The average particle size of the second binder resin particles 2 is smaller than the average particle size of the first binder resin particles. The average particle size of the first or second binder resin particles 1 or 2 is an average particle size of multiple first or second binder resin particles 1 or 2 in the ink. The average particle size of the first or second binder resin particles 1 or 2 in the ink can be measured by the heterodyne method, which is one of the frequency analysis techniques, by using a dynamic light scattering particle size distribution measuring device (NIKKISO CO., LTD.).

The first binder resin particles 1 and the second binder resin particles 2 smaller in average particle size than the first binder resin particles 1 are emulsified or suspended in the disperse solvent. Then, in an ink film formed on the print medium, the second binder resin particles 2 smaller in average particle size can adequately fill up the voids among the first binder resin particles 1 larger in average particle size. By having the second binder resin particles 2 smaller in average particle size fill up the voids among the first binder resin particles 1 larger in average particle size, the ink film formed on the print medium increases in density. This improves the ink film in strength and adhesiveness to the print medium.

By emulsifying or suspending in the disperse solvent the first binder resin particles 1 and the second binder resin particles 2 smaller in average particle size than the first binder resin particles 1, fluidity of the first binder resin particles 1 on the print medium is restricted. This reduces any chance of smearing of the ink landed on the print medium that may be caused by movements of the particles in the disperse solvent. Therefore, this ink is suitably usable in printing of, for example, fabrics with a higher rate of ink bleeding. Thus, this ink is applicable to a wide range of print media.

The average particle size of the first binder resin particles 1 is preferably equal to or greater than 100 nm and equal to or less than 2000 nm. The average particle size is more preferably equal to or greater than 150 nm and equal to or less than 400 nm. The first binder resin particles 1 whose average particle size is within the ranges are very unlikely to aggregate with one another.

The average particle size of the second binder resin particles 2 is preferably equal to or greater than 10 nm and less than 100 nm. The average particle size of the second binder resin particles 2 is more preferably smaller than $1/3$ of the average particle size of the first binder resin particles 1. Even more preferably, the average particle size of the second binder resin particles 2 is equal to or smaller than $1/2$ of the average particle size of the first binder resin particles 1. The second binder resin particles 2 thus smaller in average particle size can adequately fill up the voids among the first binder resin particles 1. This leads to a higher density of the ink film formed on the print medium, further improving the ink film formed on the print medium in strength and adhesiveness to the print medium. This also restricts fluidity of the first binder resin particles 1 on the print medium, further reducing the likelihood of ink bleeding.

The particle sizes of the first and second binder resin particles are controllable through suitable changes of polymerization conditions applied to form the binder resin particles by emulsion polymerization, suspension polymerization, dissolution suspension, or ester elongation polymerization. In any one of these polymerization techniques, the particle sizes of the binder resin particles can be controlled by optimally deciding mechanical conditions such as a speed and time of stirring an emulsion or suspension of the binder resin and chemical conditions such as quantities of an emulsifier and a polymerization initiator for emulsification or suspending, and through temperature regulation during emulsification or suspending.

The first and second binder resins, which are respectively the base materials of the first and second binder resin particles 1 and 2, preferably have different glass transition temperatures (TGs). Thus, the TG of one of the binder resins is lower than the TG of the other. This prompts one of the binder resins having the lower TG than the other to rapidly liquefy, allowing the ink to be quickly anchored to the print medium. Preferably, the TG of the first binder resin is higher than the TG of the second binder resin. This allows the second binder resin particles 2 smaller in average particle size to even more rapidly liquefy, allowing the ink to be even more quickly anchored to the print medium.

The TG of the first binder resin is preferably equal to or higher than 50° C. and equal to or lower than 80° C. The TG of the second binder resin is preferably equal to or higher than 20° C. and equal to or lower than 70° C. The first binder resin having the TG regulated to stay within the temperature range can be suitably liquefied by heating during the printing, and the ink accordingly acquires an improved storage stability.

By regulating the TG of the second binder resin within the above temperature range, the second binder resin particles 2 can be more rapidly liquefied by heating during the printing than the first binder resin particles 1. As a result, the first binder resin particles 1 can be quickly anchored to the print medium. For example, the second binder resin particles 2 on the print medium are first preheated and rapidly liquefied to prevent smearing of the ink, and the first binder resin particles 1 are then heated and thereby firmly anchored to the print medium.

Figure 2:
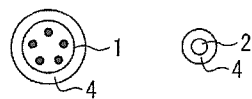
FIG. 2 is a schematic drawing of a core-shell structured particle of a binder resin.

As illustrated in FIG. 2, at least one of the first binder resin particles 1 and the second binder resin particles 2 may be core-shell structured particles coated with a shell structure 4. FIG. 2 is a schematic drawing of a core-shell structured binder resin particle. When the glass transition temperature of a binder resin is low, its particles may stick to or aggregate with one another. However, such an issue as sticking or aggregating particles can be solved by coating the first and second binder resin particles 1 and 2 with a binder resin having a glass transition temperature higher than the glass transition temperatures of these binder resin particles. By coating the first and second binder resin particles 1 and 2 both with the same binder resin, dispersion of the particles in the disperse solvent is favorably stabilized.

The TGs of the first and second binder resins can be regulated by suitably selecting the type of the exemplified materials of the binder resins and optimally changing the polymerization conditions. Assuming that an acrylic resin is used as the binder resin, the TG of the binder resin is controllable by suitably selecting monomers to be copolymerized such as acrylate, a ratio of polymerization of the monomers, and a degree of copolymer polymerization.

The concentrations of the first and second binder resin particles 1 and 2 for the whole quantity of the ink are optimally decided depending on intended purposes. The ratio of contents of the first and second binder resin particles 1 and 2 for the whole quantity of the ink can also be optimally decided. The concentrations and weight ratio of the first and second binder resin particles 1 and 2 should be decided such that the second binder resin particles 2 can adequately fill up the voids among the adjacent first binder resin particles 1.

[Coloring Agent 3]

The coloring agent 3 is not particularly limited and may be selected from variously different materials depending on intended purposes as far as they are insoluble in the vehicles. Specifically, the coloring agent may be prepared in the form of particles of one selected from the group consisting of organic pigments, inorganic pigments, disperse dyes, oxidation dyes, reactive dyes, titanium oxide, magnetic particles, alumina, silica, ceramic, carbon black, organic metals, or in the form of metal nanoparticles. The metal nanoparticles are obtained from, for example, gold, silver, copper and aluminum. Of the examples, titanium oxide is suitably used to provide a white colorant.

In the ink, the coloring agent particles have an average particle size equal to or greater than 5 nm and equal to or less than 80 nm, and more preferably equal to or greater than 10 nm and equal to or less than 50 nm. The average particle size of the coloring agent particles is an average particle size of multiple coloring agent particles dispersed in the binder resin.

A better colorability is attained with smaller particle sizes of the coloring agent. Therefore, the average particle size of the coloring agent particles of 80 nm or less leads to improvements of the ink in colorability, providing a print in more vivid colors. The coloring agent 3 is contained in the first binder resin particles 1. Therefore, the ink is still improved in light fastness even though the particles of the coloring agent 3 have an average particle size as small as 80 nm or less.

An average content ratio of the first binder resin and the coloring agent 3 in the first binder resin particles 1 is, by weight percentage, preferably 20:80 to 95:5, more preferably 75:25 to 95:5, and most preferably 65:35 to 85:15. The average content ratio of the first binder resin and the coloring agent 3 in the first binder resin particles 1 is an average content ratio of the first binder resin and the coloring agent 3 in multiple first binder resin particles 1 dispersed in the disperse solvent. The average content ratio of the first binder resin and the coloring agent 3 is controllable through suitable changes of polymerization conditions applied to form the first binder resin particles 1 by emulsion polymerization, suspension polymerization, dissolution suspension, or ester elongation polymerization.

If the ink contains the first binder resin by a too small percentage, the coloring agent 3 is exposed on the surfaces of the first binder resin particles 1, which may result in discharge instability. The percentage too high would compromise colorability of the coloring agent 3, failing to attain enough color saturation or concentration. Therefore, the ratio of the coloring agent and the first binder resin which is the base material of the first binder resin particles 1 preferably stays within a certain range of values to achieve two objects; colorability, and containment of the coloring agent 3 in the binder resin. Specifically, the average content ratio of the first binder resin and the coloring agent 3 is preferably, by weight percentage, 40:60 to 95:5. The containment of the coloring agent 3 in the first binder resin results in a lower relative gravity on average than the coloring agent 3 alone, effectively controlling precipitation of large particles.

[Disperse Solvent]

In the ink, the first binder resin particles 1 and the second binder resin particles 2 are emulsified or suspended in a disperse solvent. The disperse solvent may contain water or a hydrophilic organic solvent. A particularly preferable example of the ink according to the embodiment is an aqueous latex ink in which the first binder resin particles 1 and the second binder resin particles 2 are emulsified or suspended in the disperse solvent containing water or a hydrophilic organic solvent. The aqueous latex ink may contain, in addition to water or a hydrophilic organic solvent, a non-hydrophilic organic solvent having an affinity for the hydrophilic organic solvent. The aqueous latex ink may as well be said to contain an aqueous emulsion or an aqueous suspension formed by the binder resin. The aqueous latex ink may further contain an emulsifier for emulsifying or suspending the binder resin.

The disperse solvent is not limited to particular solvents as far as neither of the first binder resin nor the second binder resin is soluble therein, and variously different disperse solvents are usable depending on intended purposes. A specific example of the disperse solvent is water. Water, which is a very safe solvent causing no environmental damage, is suitably used in inks for inkjet printers generally used. However, using water alone is not advisable because its high drying rate is often a cause of nozzle clogging in an inkjet head. Therefore, a humectant is preferably added to water. More preferably, an organic solvent is added to water to more rapidly evaporate the disperse solvent by a heater on the print medium, thereby more effectively preventing smearing of the ink.

The ink may contain an additive in addition to the first binder resin particles 1 containing the coloring agent 3, second binder resin particles 2, and disperse solvent. The additive to be added is suitably selected depending on intended purposes from, for example, surface active agents, coupling agents, buffers, biocides, metallic ion sealing agents, viscosity modifiers, and solvents. The additive may be dispersed in the first binder resin particles 1 or the second binder resin particles 2, or may be present in the disperse solvent independently from the first binder resin particles 1 or the second binder resin particles 2.

In the ink, the disperse solvent may further contain an emulsifier for emulsifying or suspending the first binder resin particles 1 or the second binder resin particles 2. The disperse solvent may further contain another resin dissolved therein in addition to the emulsified or suspended first or second binder resin particles 1 or 2. This additional resin may be dissolved in the disperse solvent to adjust the viscosity of the ink.

When the first binder resin particles 1 and the second binder resin particles 2 which are emulsified or suspended are bonded to form a film, the additional resin dehydrated by drying may serve as a binding material, thereby strengthening the bond between the first and second binder resin particles 1 and 2. Examples of the additional resin serving as a binding material are PVA, polyvinyl pyrrolidone, rosin, vinyl chloride-vinyl acetate copolymer, and acrylic. By firmly bonding the first and second binder resin particles 1 and 2 with the aid of the additional resin serving as a binding material, smearing of the ink on the print medium is effectively prevented.

[Ink Production Method]

An ink production method according to the present invention includes: a dispersing step of dispersing or dissolving the coloring agent 3 in a first binder resin material; a first emulsifying step of emulsifying or suspending the first binder resin material containing the coloring agent; a second emulsifying step of emulsifying or suspending a second binder resin material in a disperse solvent; and a mixing step of mixing an emulsion of the first binder resin and an emulsion of the second binder resin.

The binder resins used in the production methods are preferably liquid binder resins. In the case of using solid binder resins, the resins are preferably liquefied by heating or dissolved in the solvent. The base material of the binder resin may be a monomer polymerized and transformed into a binder resin, wherein the monomer is emulsified and polymerized at the same time in the emulsifying step(s).

[Dispersing Step]

The dispersing step is a step of dispersing or dissolving the coloring agent 3 in the first binder resin material. The coloring agent 3 may be dispersed or dissolved in the binder resin material by such a device as roll mill, bead mill, ball mill, or jet mill. When a pigment, for example, is used as the coloring agent, a dispersant may be used for a better pigment dispersibility. When a dye, for example, is used as the coloring agent 3, a dye-soluble solvent may be added to and dissolved in the binder resin material. When a radically polymerizable monomer is used as the material of the binder resin, a step of dispersing or dissolving the coloring agent 3 under nitrogen conditions is preferably performed.

[First Emulsifying Step]

The first emulsifying step is a step of emulsifying or suspending the first binder resin material containing the coloring agent in the disperse solvent to prepare an emulsion of the first binder resin particles 1. In the emulsifying step may be used a stirrer, examples of which are dissolver, homomixer, homogenizer, and ultrasonic stirrer. By regulating mechanical conditions such as a stirring speed and time and a rate of feeding the first binder resin material, the particle sizes of the first binder resin particles 1 can be well-controlled.

The particle sizes of the first binder resin particles 1 are also controllable by selecting a type of radically polymerizable monomers to be used as the first binder resin material and through adjustments of quantities of a polymerization initiator for radical polymerization and an emulsifier for emulsification. Other means for controlling the particle sizes of the first binder resin particles 1 are adjustments of an emulsifying temperature and a rate of polymerization.

When a radically polymerizable monomer is used as the first binder resin material, preferably, a polymerization initiator is mixed with the disperse solvent, and the first binder resin material is added to the resulting disperse solvent while being stifled by the stirrer under nitrogen conditions. As a result, the emulsion of the first binder resin particles 1 can be prepared during the polymerization of the monomer. The first binder resin material may be mixed with an emulsifier to prepare the binder resin particles.

By stirring at high speeds the disperse solvent mixed with the first binder resin material, surface tension of the first binder resin acts upon the first binder resin particles 1, forming substantially spherical or elliptical particles. In the conventional inks, entangled resin molecular chains often cause such problems as discharge instability and poor solubility for the disperse solvent, making the use of polymer resins difficult. According to this embodiment, however, the disperse solvent containing the binder resin and its material in liquid form are stirred at high speeds for emulsifying or suspending purpose. This process forms substantially spherical or elliptical binder resin particles, which solves the problem of entangling chains. As a result, improvements are attained in the ink discharge stability and solubility for the disperse solvent.

[Second Emulsifying Step]

The second emulsifying step is a step of emulsifying or suspending the second binder resin material in the disperse solvent to prepare an emulsion of the second binder resin particles 2. In the second emulsifying step, an emulsion of the second binder resin particles 2 is prepared by using the second binder resin particles instead of the first binder resin particles used in the first emulsifying step.

[Mixing Step]

The mixing step is a step of mixing the emulsions of the first binder resin particles and the second binder resin particles respectively obtained in the first and second emulsifying steps.

In the mixing step, the conventional mixing techniques, including mixing with a dissolver, may be employed to mix the emulsions of the first binder resin particles and the second binder resin particles. High-speed stirring may be unnecessary as far as the emulsions are evenly mixed. In the mixing step, the emulsions are preferably mixed at temperatures lower than the TGs of the first and second binder resins. This prevents the first binder resin and the second binder resin from merging into each other, enabling stable ink production at room temperature.

The materials mixed in the mixing step include the dissolved resin and an additive(s) selected depending on intended purposes from surface active agents, coupling agents, buffers, biocides, metallic ion sealing agents, viscosity modifiers, and solvents.

[Inkjet Recording Method]

An inkjet recording method according to the present invention includes: a discharging step of discharging the ink according to the present invention on a print medium; and a heating step of heating the ink landed on the print medium. The inkjet recording method may further include a post-heating step subsequent to the heating step in the case of using a high molecular compound as the binder resin. The post-heating step heats the ink landed on the print medium at temperatures at which the first binder resin particles 1 can be dissolved. The inkjet recording method may further include a preheating step prior to the heating step to rapidly dissolve the second binder resin particles 2 in the ink landed on the print medium.

Using an ink containing a low-TG resin or a high-TG resin including a low-TG resin as the binder resins for the first and second binder resin particles 1 and 2 provides the advantages; only one heating step may be sufficient, and lower heating temperatures may be employed in the preheating step and the post-heating step.

Before the ink is landed on the print medium, the first binder resin particles 1 and the second binder resin particles 2 are dispersed in the disperse solvent. Immediately after the ink is discharged in the discharging step and landed on the print medium, the ink forms a layer on the print medium, so that the second binder resin particles 2 fill up the voids among the first binder resin particles 1. In the discharging step, the ink is discharged through an inkjet nozzle. To improve the discharge stability of the ink through the inkjet nozzle, the first binder resin particles 1 contained in the ink preferably have an average particle size equal to or smaller than 1/10 of the diameter of the inkjet nozzle which discharges the ink.

Then, the ink is heated in the heating step at temperatures at which the water content (solvent) of the disperse solvent can be evaporated. In the heating step, the ink layer on the printed medium is heated preferably at temperatures at which the solvent can be evaporated. The heating temperature in the heating step is preferably higher than the TG of the second binder resin particles 2 to allow the second binder resin particles 2 to liquefy while the solvent is evaporated. Accordingly, the liquefied second binder resin particles 2 anchor the first binder resin particles 1 to the print medium before smearing of the ink starts.

The heating step may heat the back side of an ink landing surface of the print medium by using a heater, or may heat the ink landing surface by delivering infrared or far-infrared thereon or by performing induction heating or blasting hot air thereto. The heating means is not particularly limited as far as the solvent is evaporated to allow the ink layer to be dried, polymerized, melted, and finally anchored.

For certain intended purposes of an obtained print, the whole print operation may end as soon as the disperse solvent is removed by heating the ink landed on the print medium. The surfaces of the first binder resin particles 1 and the second binder resin particles 2 may be swollen or partly dissolved in the presence of the solvent and accordingly fusion-bonded to one another by drying the solvent, or the disperse solvent may contain a considerable quantity of the resin dissolved therein. In such cases, the first and second binder resin particles 1 and 2 can be anchored to the print medium only by drying the solvent without liquefying the first binder resin particles 1 and the second binder resin particles 2.

In the case of using, as the first binder resin, a high molecular compound liquefied by heating at room temperature or higher or a thermally curable high molecular compound, the ink on the print medium is preferably further heated at temperatures at which the first binder resin is liquefied or cured (post-heating step). Then, the first binder resin liquefied or reacted by heating is unified and thereby firmly anchored to the print medium.

In the ink used for printing, at least one of the first binder resin particles 1 and the second binder resin particles 2 may be particles coated with a binder resin having a higher glass transition temperature than the glass transition temperature of the particles. The particles of the ink coated with such a binder resin are very unlikely to stick to or aggregate with one another because of a high glass transition temperature on the particle surfaces. The first and second binder resin particles 1 and 2 may be both coated with the same binder resin, in which case dispersion of the particles in the ink is favorably stabilized. Such an ink excels in discharge stability and provides a high-quality print.

In the ink according to the present invention, the coloring agent 3 is already dispersed or dissolved in the first binder resin particles 1. Unlike the conventional inks, the binder resins can be finally anchored to the print medium successfully without an additional high-temperature heating step for the first binder resin particles to dissolve or disperse the coloring agent contained therein. Thus, the ink is also advantageous in that relatively low heating temperatures are enough to anchor the ink to the print medium.

In the conventional inks, a coloring agent and resin particles are independently dispersed in a disperse solvent. Therefore, dispersion of the coloring agent in the disperse solvent is not possible unless the resin particles are melted. On the other hand, the coloring agent 3 is already dissolved or dispersed in the first binder resin particles 1 in the ink according to the present invention. This makes high-temperature heating unnecessary to disperse or dissolve the coloring agent 3 in the first binder resin particles 1. Thus, relatively low heating temperatures are enough to melt and unify and then anchor the binder resins to the print medium.

In the inkjet recording method according to the present invention, required temperatures at which the ink is heated are such low degrees as 40° C. to 60° C., preventing such a problem that the ink of the inkjet head nozzle is dried by high-temperature heating. This avoids the risk of poor ink dischargeability.

[Supplementary Information]

The ink according to the present invention includes: the disperse solvent; the first binder resin particles 1 containing the coloring agent 3 and emulsified or suspended in the disperse solvent; and the second binder resin particles 2 emulsified or suspended in the disperse solvent, wherein the second binder resin particles 2 have an average particle size smaller than an average particle size of the first binder resin particles 1.

In the ink thus characterized, the second binder resin particles 2 smaller in average particle size can adequately fill up the voids among the first binder resin particles 1 larger in average particle size in the ink film formed on the print medium. By having the second binder resin particles 2 smaller in average particle size fill up the voids among the first binder resin particles 1 larger in average particle size, the ink film formed on the print medium increases in density. This improves the ink film in strength and adhesiveness to the print medium.

In the ink according to the present invention, the average particle size of the first binder resin particles 1 is equal to or greater than 100 nm and equal to or less than 2000 nm.

This makes it least likely that the first binder resin particles 1 contained in the ink are aggregated.

In the ink according to the present invention, the average particle size of the second binder resin particles 2 is equal to or smaller than 1/3 of the average particle size of the first binder resin particles 1.

The second binder resin particles 2 thus smaller in average particle size can adequately fill up the voids among the first binder resin particles 1. This improves the ink layer formed on the print medium in strength and adhesiveness.

In the ink according to the present invention, the first binder resin has a glass transition temperature higher than the glass transition temperature of the second binder resin.

In the ink thus characterized, the second binder resin can be rapidly liquefied by heating the print medium after the ink is discharged thereon. Accordingly, the liquefied second binder resin quickly anchors the first binder resin particles 1 to the print medium.

In the ink according to the present invention, at least one of the first binder resin particles 1 and the second binder resin particles 2 are particles coated with a binder resin having a higher glass transition temperature than the glass transition temperature of the particles.

According to the above configuration, at least one of the first binder resin particles 1 and the second binder resin particles 2 are core-shell structured particles coated with a binder resin having a higher glass transition temperature than the glass transition temperature of the particles. Then, the particles are very unlikely to stick to or aggregate with one another because their surfaces are coated with a binder resin having a high glass transition temperature. By coating the first and second binder resin particles 1 and 2 both with the same binder resin, dispersion of the particles in the disperse solvent is favorably stabilized.

The inkjet recording method according to the present invention includes: the discharging step of discharging the ink on the print medium; and the heating step of heating the ink landed on the print medium.

According to the above configuration, the ink can be suitably used for printing of various kinds of print media.

The present invention is not necessarily limited to the embodiment described so far and may be carried out in many other forms. The technical scope of the present invention encompasses any modifications within the scope of the present invention defined by the appended claims and embodiments obtained by variously combining the technical means disclosed herein.

INDUSTRIAL APPLICABILITY

The present invention is advantageously applicable to inks such as dyes and coating agents.

The invention claimed is:

1. An ink, comprising:
a disperse solvent;
particles of a first binder resin containing a coloring agent and emulsified or suspended in the disperse solvent, wherein an average content ratio of the first binder resin and the coloring agent in the particles of the first binder resin is 20:80 to 95:5 by weight percentage; and
particles of a second binder resin containing no coloring agent and emulsified or suspended in the disperse solvent, wherein
the particles of the second binder resin have an average particle size smaller than an average particle size of the particles of the first binder resin.

2. The ink according to claim 1, wherein
the average particle size of the particles of the first binder resin is equal to or greater than 100 nm and equal to or less than 2000 nm.

3. The ink according to claim 2, wherein
at least one of the particles of the first binder resin and the particles of the second binder resin are particles coated with a binder resin having a higher glass transition temperature than the glass transition temperature of the particles.

4. The ink according to claim 1, wherein
the average particle size of the particles of the second binder resin is equal to or smaller than ⅓ of the average particle size of the particles of the first binder resin.

5. The ink according to claim 4, wherein
at least one of the particles of the first binder resin and the particles of the second binder resin are particles coated with a binder resin having a higher glass transition temperature than the glass transition temperature of the particles.

6. The ink according to claim 1, wherein
the first binder resin has a glass transition temperature higher than a glass transition temperature of the second binder resin.

7. The ink according to claim 6, wherein
at least one of the particles of the first binder resin and the particles of the second binder resin are particles coated with a binder resin having a higher glass transition temperature than the glass transition temperature of the particles.

8. The ink according to claim 1, wherein
at least one of the particles of the first binder resin and the particles of the second binder resin are particles coated with a binder resin having a higher glass transition temperature than the glass transition temperature of the particles.

9. An inkjet recording method, comprising:
a discharging step of discharging the ink according to claim 1 on a print medium; and
a heating step of heating the ink landed on the print medium.

* * * * *